(No Model.) 3 Sheets—Sheet 1.

W. W. DODGE.
GANG EDGER.

No. 304,302. Patented Sept. 2, 1884.

WITNESSES.
Jas. F. DuHamel.
Walter F. Dodge.

INVENTOR
William W. Dodge.

(No Model.) 3 Sheets—Sheet 2.
W. W. DODGE.
GANG EDGER.
No. 304,302. Patented Sept. 2, 1884.
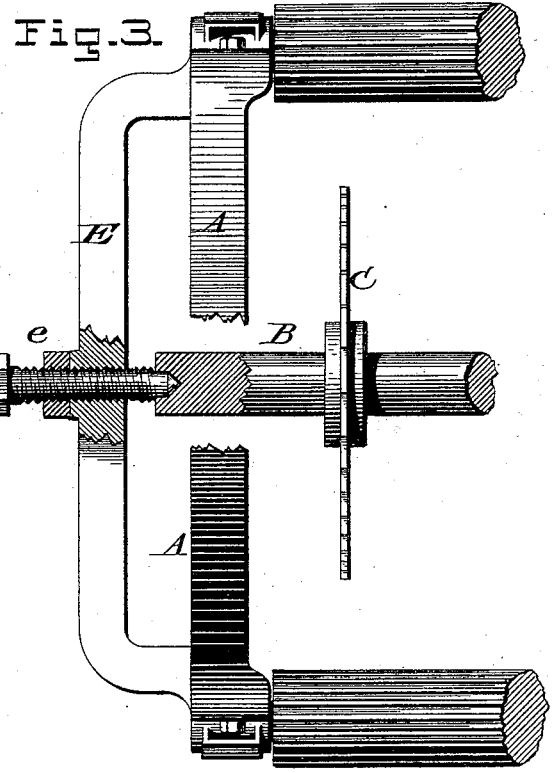
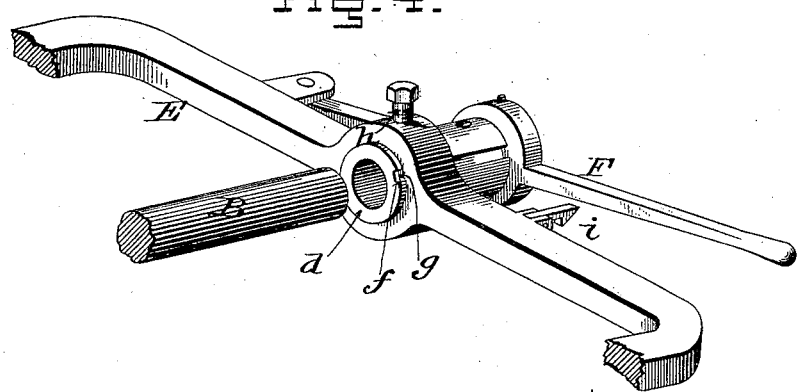
WITNESSES:
Jas. F. DuHamel
Walter L. Dodge.
INVENTOR:
William W. Dodge.

(No Model.) 3 Sheets—Sheet 3.

W. W. DODGE.
GANG EDGER.

No. 304,302. Patented Sept. 2, 1884.

WITNESSES: INVENTOR

United States Patent Office.

WILLIAM W. DODGE, OF WASHINGTON, DISTRICT OF COLUMBIA.

GANG-EDGER.

SPECIFICATION forming part of Letters Patent No. 304,302, dated September 2, 1884.

Application filed March 28, 1884. (No model.)

*To all whom it may concern:*

Be it known that I, WILLIAM W. DODGE, of Washington, in the District of Columbia, have invented certain Improvements in Gang-Saw Edgers, of which the following is a specification.

My invention relates to that class of machines known as "gang-saw edgers," in which a number of circular saws are mounted upon an arbor, and some made adjustable to edge boards of different widths.

This invention is applicable to all machines in which a series of saws are mounted on one arbor; and it consists in combining with said arbor a fixed support at each end, a bearing at one end adapted to support the arbor when the opposite end is unsupported, and a bearing for said opposite end of the arbor, the latter bearing and the arbor being so arranged in relation one to the other that one may be withdrawn from the other a sufficient distance to permit the saw to be slipped off the end of the arbor and removed between its end and bearing without disturbing the fixed support at either end of the shaft.

Figure 1:
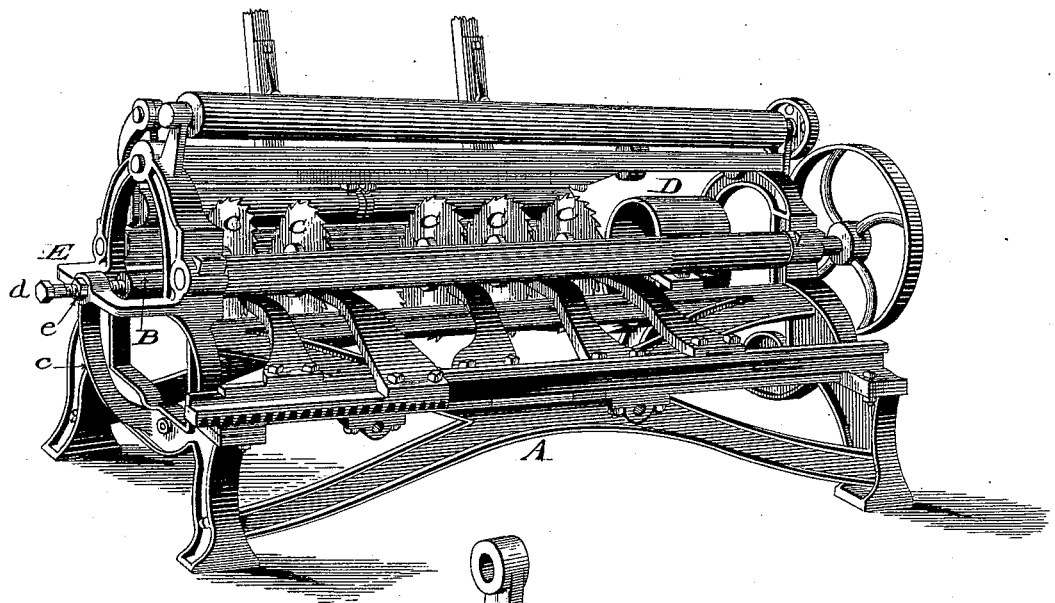
Figure 2:
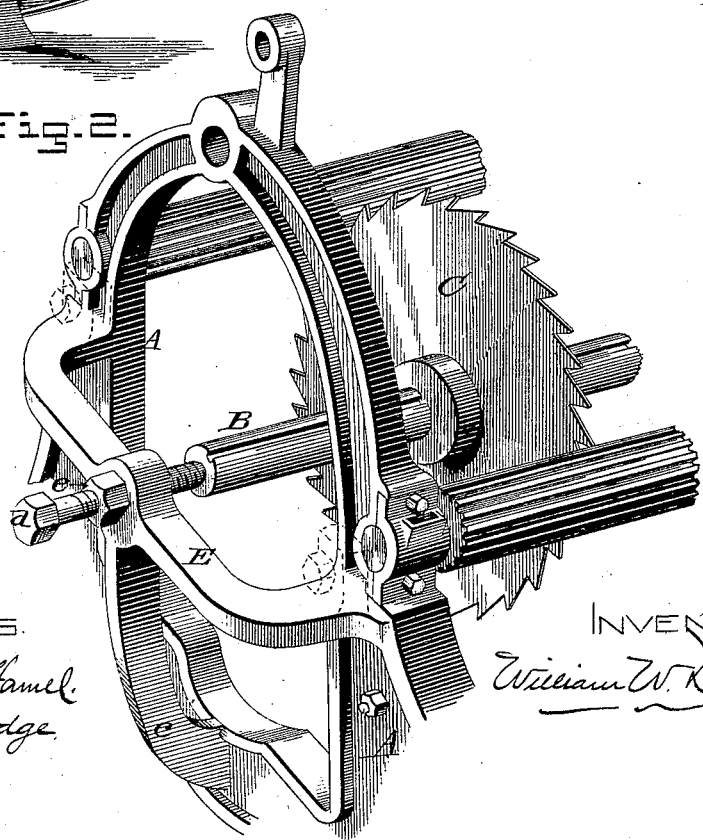
Figure 5:
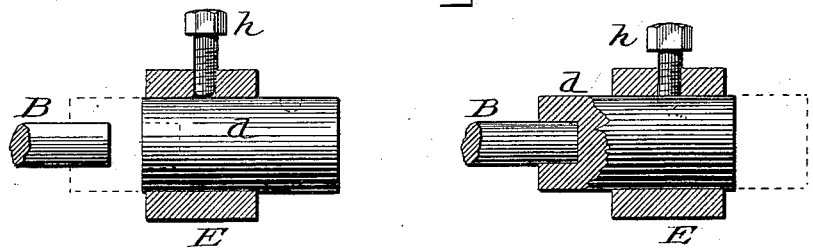
Figure 6:
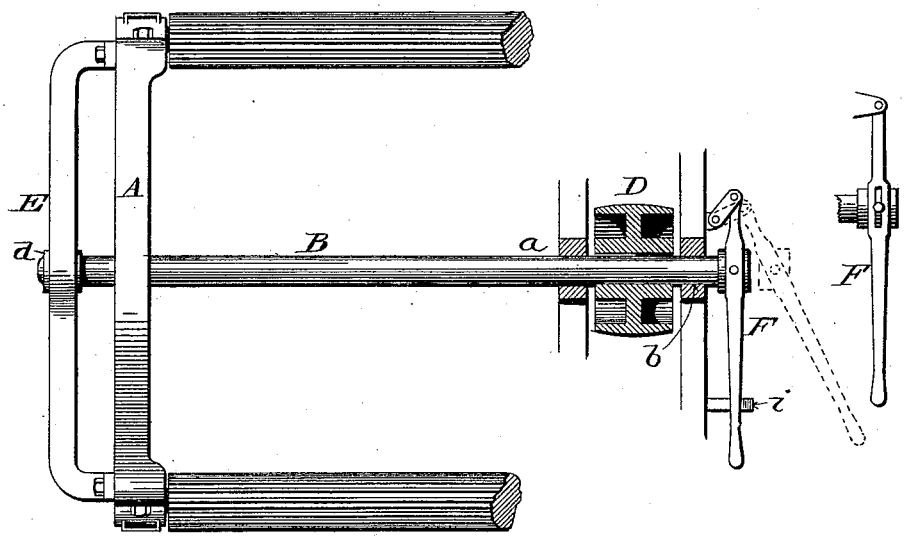

In the accompanying drawings, Figure 1 is a perspective view of a machine embodying my invention; Fig. 2, a larger perspective view of the end of the machine, showing the improvement more clearly; Fig. 3, a plan view, partly in section, showing the parts to which the invention relates; Fig. 4, a perspective view showing a sleeve or hollow bearing instead of the center screw of Figs. 1, 2, and 3; Fig. 5, a view illustrating the adjustments of the bearing; Fig. 6, a plan view, partly in section, showing the shaft or arbor arranged to move instead of the bearing.

The purpose of my invention is to enable the operator to remove the saws from the arbor at any time without dismounting the shaft or arbor and without removing any portion of the frame of the machine.

Hitherto machines have been manufactured in which the box or journal for one end of the shaft or arbor was secured upon a removable bridge or cross-bar; but such construction is open to severe objections, requiring the bolts or fastenings of the bridge or cross-piece to be removed whenever a saw was to be taken from the arbor, necessitating a peculiar and somewhat difficult casting to be made to receive the ends of the cross-bar, and involving the use of a detachable part, which is always objectionable in machinery. Under my construction no part of the machine is removed except the saw or saws, the frame is more rigid, and the saws may be quickly and easily removed.

Referring now to the drawings, A indicates the frame of a gang-edger, which frame may be of any usual design and construction, except in so far as a special construction is herein pointed out. The press-rollers, shifting-levers, return-roller, and all other parts not specifically described may likewise be constructed and arranged in any convenient and usual manner.

B indicates the saw-arbor, upon which are mounted saws C. One of these saws—the one nearest the driving-pulley D—is usually fixed in position; but the others are commonly made movable upon the arbor B, which is grooved or feathered to receive or fit a feather or groove in the bosses or hubs of the saws, the saws being moved laterally by levers provided for the purpose. One end of the shaft—the end to which the driving-pulley D is applied—is carried in bearings *a b*, formed in or secured to cross-braces of the frame A, the pulleys D being mounted upon the arbor between the bearings. The separation of the bearings is such as to afford a good support for the arbor entirely sufficient to sustain it with the weight of its saws when unsupported at its opposite end and while at rest, though of course not sufficient to prevent vibration of the arbor if driven without support at said opposite end.

E indicates a bridge or cross-bar cast with or firmly secured to the end of the frame A opposite to the bearings *a b*. This cross-bar is preferably braced by an arm, *c*, extending downward from its middle to the frame A, as in Fig. 2, to give firmness to the cross-bar, and it is set outward beyond the end of frame A, as shown in Figs. 1, 2, and 3, to give room for the saws to be passed in and out between the ends of the frame and the bridge or cross-bar.

*d* indicates the bearing for the end of arbor B, which may be a pointed screw, as in Figs. 1, 2, and 3, or a sleeve or tubular block, as in Figs. 4 and 5, or, if the shaft is made movable, may be simply the usual box or bearing, as in Fig. 6, if the shaft be made longitudinally adjustable, as I propose, in some instances, to make it.

In Figs. 1 to 5, inclusive, the shaft or arbor is shown of such length that it does not reach the inner surface of the bridge or cross-bar E, a space being left between its end and the cross-bar equal to or slightly greater than the thickness of the hub or boss of the saws C, the bearing screw or block $d$ being made longitudinally adjustable in relation to the cross-bar, so as to open or close the intermediate space, as required. When the bearing $d$ is made in the form of a screw, as in Figs. 1, 2, and 3, it is adjusted by simply turning or screwing it through the bar, and is held against turning back by a jam-nut, $e$. If made in the form of a sleeve, as in Figs. 4 and 5, it may still be threaded and screwed through the bridge or cross-bar; but I prefer to make it of cylindrical form, with a groove, $f$, to receive a guiding-feather, $g$, and is secured in its working position by a set-screw, $h$. The block $d$ may be moved in and out by hand; or a hand-lever, F, may be provided for the purpose, as in Fig. 4, in which case a latch or hook, $i$, may be employed to hold the lever and the block in position for the latter to sustain the arbor. If desired, the arbor may itself be made longitudinally movable relatively to the bearing $d$, as illustrated in Fig. 6, the ordinary form of the bearing being used at $d$, and the arbor being arranged to slide through bearings $a\ b$ and driving-pulley D. The hand-lever F and latch or hook $i$ may in this case be applied to the arbor instead of the bearing $d$, as shown in the drawings.

It is obviously immaterial whether the arbor is movable and the bearing fixed, or the arbor fixed and the bearing movable; and it is likewise unimportant that the cross-bar or bridge be in a horizontal position or set out from the frame, provided sufficient space be left between the end of the arbor and the cross-bar, when proper adjustment is made of the bearing or arbor, to permit the saws to be slipped off the arbor, removed through the space between the arbor and the cross-bar, and withdrawn through the frame of the machine in any direction. The form and construction shown is, however, deemed best. The usual circular opening is made in the frame A, to permit the insertion and removal of the saws.

I am aware that a sectional saw-arbor has been patented, designed to accomplish the purpose of my invention—that is to say, a saw-arbor has been made of a length less than the distance from the bearings at one end to the bearing for the other end, the arbor being made with a threaded conical socket to receive the threaded taper end of the "removable journal" or short section. I make no claim to such construction, which, for many reasons, I deem less desirable than mine. My plan permits me to compensate for wear of the adjustable bearing of the arbor-journal by simply making them tapering and setting the bearing up from time to time, is cheap to make, quick and easy to adjust, and is not subject to the serious objection of being liable to become so tightly screwed or bound together as to interfere with the opening of the space between the end of the arbor and the cross-bar of the frame.

I am also aware that, besides the machines noted in the fore part of this specification, others have been proposed in which the journal box or bearing was to be pivoted to the cross-bar and the cross-bar hinged or pivoted to the machine. Such construction I consider even less desirable than the first mentioned, and for substantially the reasons mentioned in connection therewith.

It is important that the adjustable bearing be held against rotation and consequent wear, in order to preserve its position accurately and to maintain its steadiness and firmness, and this I accomplish by my construction.

Having thus described my invention, what I claim is—

1. In a machine substantially such as described and shown, the combination of a frame having two rigid bars or supports, a saw shaft or arbor, and bearings for said arbor, carried by the supports, said arbor and its bearing at one end being adjustable one in relation to the other, substantially as described and shown, whereby a space may be afforded between them for the removal of a saw or saws without dismounting the arbor or removing either supporting-bar.

2. In a machine substantially such as described, the combination of a saw-arbor, a fixed bearing at one end of the arbor, a fixed supporting-bar at the opposite end of the arbor and removed a distance sufficient to permit the removal of the saws and their hubs or spacing-collars therefrom, and a bearing for the end of the arbor supported by and adjustable in relation to the said bar, substantially as and for the purpose explained.

3. In combination with frame A and arbor B, mounted in fixed bearings at one end, fixed cross-bar E at the opposite end, separated from the arbor a distance sufficient to permit the removal of the saws and attendant parts, and provided with an adjustable bearing therefor, substantially as described and shown.

4. In combination with frame A and arbor B, supported therein in fixed bearings at one end, fixed cross-bar E at the opposite end, separated from the end of the arbor a sufficient distance to permit the passage of the saw-hub between them, and bearing $d$, passing through the cross-bar, held against rotation therein, and adjustable to and from the end of arbor B, substantially as and for the purpose set forth.

5. In combination with frame A, having fixed cross-bars at both ends, to support the arbor-bearings, arbor B, and bearing $d$, said arbor and bearing being adjustable one in relation to the other, hand-lever F, connected with the adjustable part and adapted to move the same, substantially as described and shown.

6. In combination with a main frame having a fixed cross-bar at each end, an arbor, and a movable bearing for one end of said arbor, jointly extending from one cross-bar to the other, and a hand-lever connected with the movable bearing, and serving to move it to and from the arbor independently of its supporting cross-bar.

7. In combination with a frame having a fixed cross-bar at each end, a longitudinal arbor, and a bearing for one end of said arbor, jointly extending from one cross-bar to the other, one of said parts being longitudinally movable to and from the other, a hand-lever connected with the movable part, and a latch adapted to engage and hold the hand-lever at any desired adjustment.

8. In a circular sawing machine substantially such as described and shown, the combination of a frame provided with a fixed cross-bar at each end and bearings mounted upon said cross-bar, and a saw-arbor carried at its ends by said bearings, one of the cross-bars being set out beyond the vertical plane of the end of the main frame, the bearing carried by said cross-bar and the saw-arbor being adjustable one in relation to the other, whereby a space is afforded between the end of the frame and the cross-bar for the removal of the saws when the arbor and bearing are separated.

WILLIAM W. DODGE.

Witnesses:
 WALTER S. DODGE,
 W. C. DODGE.